United States Patent Office 3,705,849
Patented Dec. 12, 1972

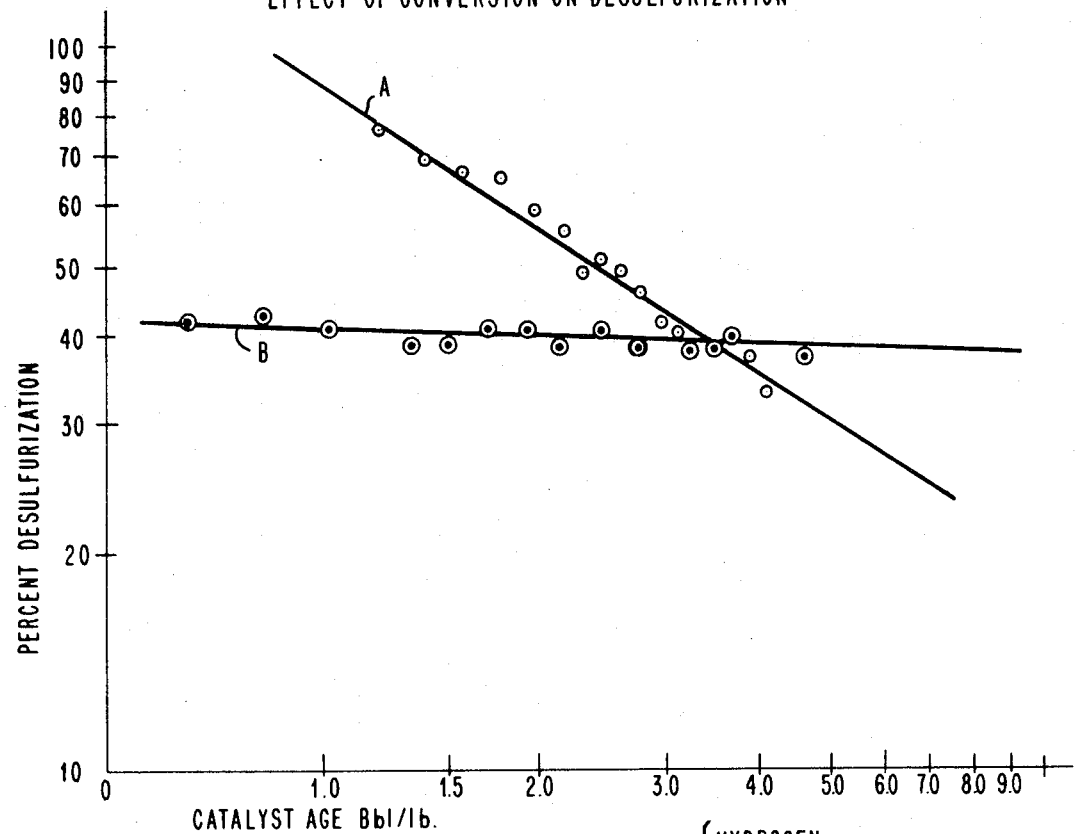
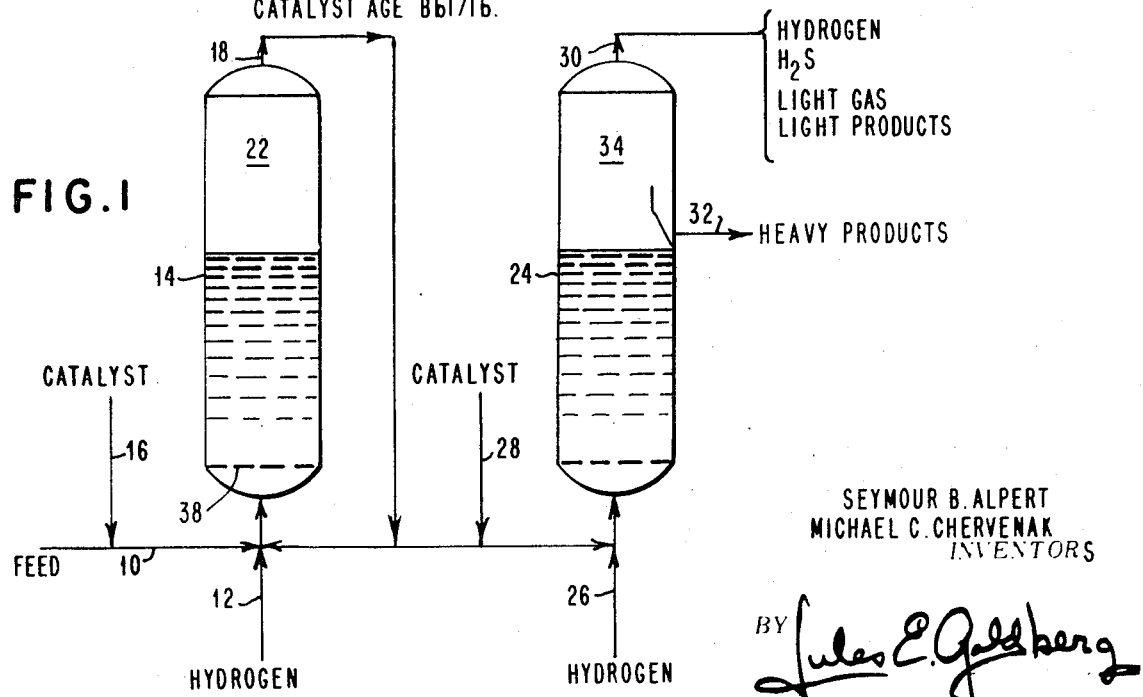

3,705,849
FUEL OIL DESULFURIZATION
Seymour B. Alpert, Princeton, and Michael C. Chervenak, Pennington, N.J., assignors to Hydrocarbon Research, Inc., New York, N.Y.
Continuation of abandoned application Ser. No. 746,419, July 22, 1968. This application Feb. 22, 1971, Ser. No. 117,725
Int. Cl. C08g 13/02, 23/02, 37/02
U.S. Cl. 208—59   3 Claims

ABSTRACT OF THE DISCLOSURE

A process for desulfurization of a residuum feed material at low severities wherein the conversion of 975° F.+ materials in the feed is less than 50%, utilizing a series of ebullated catalytic bed hydrogenation reactors.

RELATED APPLICATION

This application is a continuation of S.N. 746,419 filed July 22, 1968 and now abandoned.

BACKGROUND OF THE INVENTION

This invention pertains to the field of refining of mineral oils to effect the removal of either free or combined sulfur from the oil by plural stage treatments with hydrogen.

The ebullated bed hydrogenation process as disclosed by Johanson in Re. 25,770, made available to the petroleum processing industry a new and more efficient method of contacting a crude petroleum fraction so as to bring about hydrocracking, desulfurization, fuel oil or naphtha production, etc. The advantages obtained with this process are primarily a result of the improved temperature control throughout the catalytic bed and the ease of catalyst replacement on a continuous basis.

In the application of the ebullated bed process of Johanson to the upgrading of a residuum feed material to a desulfurized heavy fuel oil, it is desirable to minimize the hydrogen requirements for hydrocracking and desulfurization. At higher conversion levels, which also give the high desulfurization levels desired, problems with product instability, shortened catalyst life and process continuity have been observed. These problems act to offset, somewhat, the advantages that are normally derived from the ebullated bed concept.

SUMMARY OF THE INVENTION

We have discovered a method whereby improved desulfurization, hydrogen consumption, catalyst life and process continuity can be obtained utilizing the ebullated bed technique. More particularly, we have found that by utilizing two or more ebullated bed stages in series and by operating the process at a combination of conditions of temperature, pressure, space velocity, etc., such that the conversion of 975° F.+ materials is below 50%, significant improvements in desulfurization efficiency can be obtained.

Specifically, we have discovered that the hydrogen consumption can be reduced by approximately 15% over that required by a single stage operation. Also, not only is the catalyst activity increased, but also the process continuity and uniformity and the product stability are significantly improved.

DESCRIPTION OF THE DRAWING

FI1. 1 is a schematic diagram of a multiple stage desulfurization process.

FIG. 2 is a graph comparing the effect of 40 vs. 80 percent 975° F.+ conversion on catalyst deactivation for desulfurization performance.

DESCRIPTION OF THE PREFERRED EMBODIMENT

As shown in the drawing, a heavy feed material such as atmospheric or vacuum bottoms or a residuum having at least 25 vol. percent of components boiling above about 975° F. at 10, together with hydrogen at 12 is introduced into a reactor 14 such as shown in the Johanson patent, Re. 25,770. Such a reactor will be suitably charged with a desulfurization catalyst, the particles of said catalyst having a narrow size distribution in the range from about 20 to about 325 mesh (U.S. scale). A small make-up of fresh catalyst is entered with the feed at 16. Alternately, catalysts in the form of extrudates of about ¼" to about 1/32" diameter may be used.

The catalyst may be any type of material which can effect hydrogenation of the sulfur compounds in the feed. Particular examples would be cobalt molybdate on alumina, nickel molybdate on alumina and nickel tungstate on alumina. Normally, the catalyst consists essentially of alumina promoted with metals and compounds of metals selected from groups VIb and VIII of the periodic table.

The liquid and gas upflow through the bed of catalyst should be such that it will expand the catalyst bed at least 10% based on the bed volume with a fluid flow, and such that the particles are all in a random motion in the liquid. In such condition, the bed is ebullated as described in the said Johanson patent. As stated therein, it is a relatively simple matter to operate any particular process so as to cause the mass of contact material employed to become ebullated, and to calculate the percent expansion of the ebullated mass of any given set of reaction conditions. In most processes carried out in accordance with this invention, the expanded volume of the ebullated mass will exceed by 10%, but not more than 100%, the volume of the settled mass.

Under the preferred conditions of temperature, pressure, throughput and product composition as hereinafter set forth, a total effluent is removed at 18 and is conducted to the second stage reactor 24.

Similar operations are carried out in the second stage reactor. The liquid feed at 20 is combined with additional hydrogen at 26 and is passed upwardly through the same or a similar type of catalyst. A small amount of additional make-up catalyst may also be added at 28. A gaseous effluent is removed at 30 and a liquid is removed at 32 from the upper portion of zone 34. While internal separation of liquid and gaseous effluents from the final stage is shown, the separation may be performed in flash pots external of the reactor. Generally, in a low conversion process of this type, the vapor products will be minimal.

A third reactor operating in essentially the same manner may also be employed.

The recycle of liquid effluent from above the zone 34 to below the distributor deck 38 is usually desirable to establish a sufficient upflow velocity to assist in maintaining a catalyst in random motion in the case of catalyst in the form of 1/32 to ¼" diameter extrudates. This recycle may be accomplished either externally or internally as described in Johanson, supra. In the case of a catalyst having a natural size distribution in the range of 60 to 270 mesh, recycle is not necessary to maintain the catalyst in the ebullated state.

The distributor deck 38 is, of course, suitably perforated and may have bubble caps thereon as shown in U.S. Pat. 3,197,288.

In general, it is envisioned that the reaction conditions utilized in our invention would be within the temperature ranges from about 750 to about 850° F. with a total pressure from the range of 800 to 3000 p.s.i.g., a hydrogen throughput in the range from about 1000 through about 10,000 s.c.f./bbl. and with a total space velocity greater than 0.25 $V_t/hr./V_r$. It is important to note, however, that only some of the particular combinations of the above ranges of reaction conditions may be used to effect the advantages of applicants invention and, thus, our invention is limited to those combinations of the above conditions which will maintain the total conversion of the position of charge stocks boiling above about 975° F. to lower boiling materials at less than about 50%, and preferably between about 20 to about 40%.

The use of multiple stage processing with the stages operating at overall conversion levels of less than 50 wt. percent, has numerous advantages which are more clearly delineated by the following examples.

EXAMPLE I.—EFFECT OF STAGING ON DESULFURIZATION PERFORMANCE ON A FEED OF WEST TEXAS RESIDUUM

| Operating conditions | Feed | Two | One |
|---|---|---|---|
| No. of stages: | | | |
| First stage— | | | |
| Hydrogen pressure, p.s.i.g | | 2250 | 3,000 |
| Temperature, ° F | | 815 | 815 |
| Space velocity, $V_f/hr./V_r$ | | 5.4 | 2.7 |
| Hydrogen rate, s.c.f./bbl | | 6,500 | 6,300 |
| Second stage— | | | |
| Hydrogen pressure, p.s.i.g | | 2,250 | |
| Temperature, ° F | | 815 | |
| Space velocity, $V_f/hr./V_r$ | | 5.4 | |
| Hydrogen rate, s.c.f./bbl | | 6,000 | |
| Catalyst | 1/16″ CoMo on alumina | | |
| Catalyst Replacement, lb./bbl | | 0.05 | 0.05 |
| Overall space velocity, $V_f/hr./V_r$ | | 2.7 | 2.7 |
| Yields, percent on feed: | | | |
| $C_1-C_3$, wt. percent | | 2 | 2 |
| $C_4$-250° F., vol. percent | | 3 | 3 |
| 250° F. plus fuel oil | | 100 | 100 |
| Percent conversion of 975° F.+ | | 40 | 40 |
| Inspections: | | | |
| 250° F. plus fuel oil: | | | |
| Gravity, ° API | 16.8 | 23.5 | 24.7 |
| Sulfur, wt. percent | 2.54 | 0.8 | 0.8 |
| Hydrogen consumption, s.c.f./bbl | | 540 | 630 |
| Hydrogen consumption/sulfur removed, s.c.f./lb. sulfur | | 89 | 103 |

Example I shows the specific improvement that can be obtained with our invention as compared to a system without staging. Particularly, it will be noticed that 15% less hydrogen is required in the stage process as opposed to the single stage system for the removal of an equivalent amount of sulfur. Such decrease is quite significant in that the hydrogen requirement is one of the major economic considerations in such processes.

EXAMPLE II.—EFFECT OF STAGING ON CATALYST REPLACEMENT RATE

| Operation | 1 stage | 2 stage-series reactors |
|---|---|---|
| Feed | (1) | (2) |
| $H_2$ pressure | 2,000 | 2,000 |
| Temperature, ° F | 775 | 775 |
| Space velocity, $V_f/hr./V_r$ | 0.7 | 0.7 |
| Hydrogen rate, s.c.f./bbl | 7,000 | 7,000 |
| Percent sulfur in product | 1.25 | 1.25 |
| Catalyst replacement, lb./bbl | 0.15 | 0.04 |
| Conversion of 975° F.+, percent | 40 | 40 |

[1] 7° API, 5.3 wt. percent S.
[2] Kuwait vacuum resid.

Example II shows the very significant improvement and savings in terms of catalyst replacement rate that can be achieved by the use of our invention. As can be seen for a given feed material at essentially the same reaction condition, the catalyst replacement rate in lbs. of catalyst used per barrel for a single stage process was 0.15 as compared to 0.04 lb. of catalyst per bbl. for the two stage process. This represents a large savings in overall catalyst costs when desulfurizing a feed from 5.3 wt. percent S to 1.25 wt. percent S. These savings result from metals in the feed being selectively deposited in the first stage, leaving the second state catalyst in a relatively uncontaminated condition.

The conversion level is critical because it effects not only the catalyst activity, but also the product stability.

Other observed data

FIG. 2 is a graph based on observed data comparing the catalyst performance for two stage ebullated bed processes at different conversion levels. The runs depicted in FIG. 2 were operated at a pressure of 2250 p.s.i.g., using two stages at an overall space velocity of 1 $V_t/hr./V_r$. Curve A represents the data obtained for a conversion level of 80 percent of the 975° F. plus fraction with the temperatures of the first and second stages being 850° F. and 775° F. respectively. Curve B represents the data obtained at a conversion level of approximately 40 percent of 975° F. plus fraction with the temperatures of the first and second stages being 775° F. and 775° F. respectively. As shown, while the initial desulfurization activity is greater at higher conversions, with increase in catalyst age, the activity falls off at a steeper rate. At the lower conversion level, the desulfurization rate remains substantially constant for much longer periods of on-stream time.

EXAMPLE III.—CARBON ANALYSIS OF SPENT CATALYST

| Wt. percent carbon vs. conversion at pressure of— | | | Conversion level, wt. percent 975° F.+ |
|---|---|---|---|
| 1,000 p.s.i.g. | 1,500 p.s.i.g. | 2,000 p.s.i.g. | |
| 12 | 12 | 12 | 40 |
| 38 | 25 | 20 | 65 |
| 50 | 30 | 25 | 75 |

As heretofore mentioned, deposition of metals is a major cause of catalyst deactivation. A second major factor is the coking or carbon build-up on the catalyst. Example III shows the results of carbon analyses of spent catalysts from the second stage of two stage runs made at varying pressures and conversion levels. It is evident from this example that not only is the carbon build-up decreased by operation at lower conversion levels, but also, the variation of carbon build-up is much less with variation in pressure. This lends improved uniformity to the overall process.

To obtain the above mentioned advantages, however, we have found that not only is the staging as described above required, but also it is necessary that the combination of reaction conditions including temperature, pressure, space velocity, etc. be such that the overall conversion of 975° F.+material in the feed is less than 50 weight percent.

EXAMPLE IV

Fuel oil stability analysis [1]

| Conversion level, wt. percent, 975° F.+: | Result No.[2] |
|---|---|
| 30 | 1 |
| 40 | 1 |
| 50 | 1 |
| 60 | 2 |
| 70 | 3 |

[1] Navy Special Fuel Test, ASTM D-1661.
[2] 1—pass; 2—marginal; 3—fail.

Example IV shows the results obtained with the Navy Special Fuel Test for fuel oil stability, using 250° F. plus boiling material produced from a two-stage operation at various conversion levels. As the conversion level increases above 50 wt. percent, the stability as measured by this standard test deteriorates significantly.

Thus, the overall effect of conversion on desulfurization activity, efficiency and product stability is such that optimum desulfurization processing with multiple stage systems, as described above, exists only at conversion levels less than about 50 wt. percent.

Thus, we have found that by the use of a multiple stage process at such conversion levels, unexpected and quite significant improvements can be realized in both the efficiency of the hydrogen consumption with respect to the amount of hydrogen needed to remove a given amount of sulfur and in the overall catalyst replacement rate that is required by the process.

Modifications of this invention will occur to those skilled in the art upon consideration of this disclosure, without departing from the spirit or scope thereof and accordingly only such limitations should be imposed on the invention as are set forth in the appended claims.

We claim:

1. An improved process for producing a stable, low sulfur, heavy fuel oil from a sulfur containing crude petroleum charge stock containing at least about 25 volume percent of components boiling above about 975° F. wherein the charge, in liquid phase, is passed upwardly with a hydrogen rich gas through a first reaction zone containing a hydrodesulfurization catalyst under conditions in which the catalyst is maintained in random motion in the liquid, and wherein the temperature in the reaction zone is maintained in the range of 750° to 850° F., the total pressure is in the range of 800 to 3000 p.s.i.g. and a hydrogen throughput from about 1000 to about 10,000 standard cubic feet per barrel of feed wherein the improvement comprises:
    (a) passing the combined gaseous and liquid effluent from the first reaction zone to the second reaction zone without substantial change in temperature or pressure with additional hydrogen upwardly through a subsequent reaction zone containing a bed of particulate desulfurization catalyst under conditions in which the catalyst is maintained in random motion in the liquid;
    (b) operating the reaction zones under a combination of reaction conditions including a space velocity of about 5.4 $V_t/hr./V_r$ in each reaction zone and an overall space velocity of about 2.7 $V_t/hr./V_r$ to maintain the total conversion of charge stock boiling above 975° F., to stable, heavy fuel oils, at less than 50 percent by weight with a substantially constant desulfurization rate whereby the catalyst replacement rate is decreased, the carbon build up on the catalyst is decreased and the hydrogen consumption per pound of sulfur is decreased.

2. The process as claimed in claim 1 wherein the conditions in the first reaction zone are: temperature about 815° F.; hydrogen partial pressure about 2250 p.s.i.; hydrogen rate, about 6500 s.c.f./bbl.; and the conditions in the second reaction zone are: temperature about 815° F.; hydrogen partial pressure, about 2250 p.s.i.; hydrogen rate, about 6000 s.c.f./bbl.; and wherein the catalyst used in both reaction zones is cobalt molybdate on alumina and the catalyst replacement rate is about 0.4 pound of catalyst per barrel of feed.

3. The process of claim 2 wherein the conversion of charge stock boiling above 975° F., to stable, heavy fuel oils, is 20 to 40 percent.

References Cited

UNITED STATES PATENTS

| | | | |
|---|---|---|---|
| 3,418,234 | 12/1968 | Chervenak et al. | 208—59 |
| 3,183,178 | 5/1965 | Wolk | 208—58 |

DELBERT E. GANTZ, Primary Examiner

G. E. SCHMITKONS, Assistant Examiner

U.S. Cl. X.R.

208—210, 213, 216